United States Patent
Naguib

(10) Patent No.: US 7,724,835 B2
(45) Date of Patent: May 25, 2010

(54) SPACE-TIME BLOCK CODING IN ORTHOGONAL FREQUENCY DIVISION COMMUNICATION SYSTEMS

(75) Inventor: Ayman Fawzy Naguib, Cupertino, CA (US)

(73) Assignee: Qualcomm Incorporated, San Diego, CA (US)

( * ) Notice: Subject to any disclaimer, the term of this patent is extended or adjusted under 35 U.S.C. 154(b) by 815 days.

(21) Appl. No.: 11/111,049

(22) Filed: Apr. 20, 2005

(65) Prior Publication Data

US 2005/0254596 A1 Nov. 17, 2005

Related U.S. Application Data

(60) Provisional application No. 60/572,160, filed on May 17, 2004.

(51) Int. Cl.
*H04B 7/02* (2006.01)
*H04L 1/02* (2006.01)

(52) U.S. Cl. .................. 375/267; 375/299; 375/347; 375/349

(58) Field of Classification Search ......... 375/259–260, 375/262–263, 295, 299, 316, 340–343, 267
See application file for complete search history.

(56) References Cited

U.S. PATENT DOCUMENTS

| 2003/0095533 | A1* | 5/2003 | Joo et al. | 370/343 |
|---|---|---|---|---|
| 2004/0013211 | A1* | 1/2004 | Lindskog et al. | 375/347 |
| 2004/0022183 | A1 | 2/2004 | Li et al. | |
| 2004/0120274 | A1* | 6/2004 | Petre et al. | 370/320 |
| 2004/0196919 | A1* | 10/2004 | Mehta et al. | 375/267 |
| 2005/0152473 | A1* | 7/2005 | Maltsev et al. | 375/299 |
| 2005/0185575 | A1* | 8/2005 | Hansen et al. | 370/208 |

OTHER PUBLICATIONS

Tarokh et al. "Space-Time Block Coding for Wireless Communications: Performance Results", IEEE Journal Selected Areas in Communications, 17(3): 451-460, 1999.*
Song et al. "Unitary Alamouti Code Design from APSK Signals with Fast Maximum-Likelihood Decoding Algorithm", IEEE, p. 210.*
Al-Dhahir et al., "Three Space-Time Block-Coding Schemes for Frequency-Selective Fading Channels with Application to Edge," IEEE 54th Vehicular Technology Conference, XP010562281 (2001).
Stamoulis et al., "Space-Time Block-Coded OFDMA With Linear Precoding for Multirate Services," IEEE Transactions on Signal Processing, XP001200909 50(1):119-129 (2002).
Uysal et al., "A Space-Time Block-Coded OFDMA Scheme for Unknown Frequency-Selective Fading Channels," IEEE Communications Letters, XP 001110782 5(10):393-395 (2001).
OA mailed Jan. 10, 2008 for Australian Patent Application Serial No. 2005330573, 2 pages.
OA mailed Nov. 1, 2007 for Chilean Patent Application Serial No. 1069-2005, 3 pages.

(Continued)

*Primary Examiner*—Shuwang Liu
*Assistant Examiner*—James M Perez
(74) *Attorney, Agent, or Firm*—Turocy & Watson, LLP

(57) ABSTRACT

Transmitters, receivers, and methods for providing improved transmit diversity orthogonal frequency division multiplexed communication systems is provided.

5 Claims, 5 Drawing Sheets

OTHER PUBLICATIONS

OA mailed Nov. 29, 2008 for Chilean Patent Application Serial No. 1069-2005, 3 pages.
OA mailed Jan. 17, 2008 for European Patent Application Serial No. 05758402.1, 9 pages.
OA mailed Jun. 18, 2008 for European Patent Application Serial No. 05758402.1, 8 pages.
OA mailed Sep. 1, 2009 for Japanese Patent Application Serial No. 2007-527256, 7 pages.
OA mailed Oct. 31, 2008 for Korean Patent Application Serial No. 10-2006-7026691, 4 pages.
OA mailed Feb. 29, 2008 for Korean Patent Application Serial No. 10-2006-7026691, 5 pages.
Oa mailed Aug. 26, 2009 for Mexican Patent Application Serial No. PA/a/2006/014848, 5 pages.
OA mailed Jul. 3, 2009 for Phillipines Patent Application Serial No. 12006502285, 1 pages.
OA mailed Apr. 22, 2008 for Russian Patent Application Serial No. 2006144834/09, 6 pages.
OA mailed Feb. 26, 2009 for Vietnamese Patent Application Serial No. 1-2006-02074, 2 pages.

* cited by examiner

SPACE-TIME BLOCK CODING IN ORTHOGONAL FREQUENCY DIVISION COMMUNICATION SYSTEMS

CROSS REFERENCE TO RELATED APPLICATIONS

This application claims priority from Provisional Application No. 60/572,160, filed May 17, 2004, entitled "Space-Time Block Coding for OFDM via Time Domain Processing," which is assigned to the assignee of the present application and fully incorporated herein by reference in its entirety.

BACKGROUND OF THE DISCLOSURE

The present disclosure relates to wireless communication systems, and more particularly to transmission diversity in orthogonal frequency division multiplexing systems.

Demand for wireless digital communication and data processing systems is on the rise. Inherent in most digital communication channels are errors introduced when transferring frames, packets or cells containing data over a channel that has some characteristics. Such errors are often caused by interference or thermal noise. The bit error rates of wireless transmission systems pose certain difficulties in designing encoding and decoding schemes for data to be transmitted via such systems. Partly because of its mathematical tractability and partly because of its application to a broad class of physical communication channels, the additive white Gaussian noise (AWGN) model is often used to characterize the noise in most communication channels.

One type of wireless communication system is an Orthogonal Frequency Division Multiplexed (OFDM) system. OFDM is a multi-carrier modulation technique that partitions the overall system bandwidth into multiple (N) orthogonal frequency subcarriers. These subcarriers may also be called tones, bins, and frequency channels. Each subcarrier may be modulated with data. Up to N modulation symbols may be sent on the N total subcarriers in each OFDM symbol period. These modulation symbols are converted to the time-domain with an N-point inverse fast Fourier transform (IFFT) to generate a transformed symbol that contains N time-domain chips or samples.

To improve transmission diversity, space-time block coding in each of the two transmission paths has been developed, as described in Alamouti, "Space-Time Block Coding, A Simple Transmit Diversity Technique for Wireless Communications", IEEE Journal on Selected Areas in Communications, Volume 16, pp. 1451-1458, October 1998, the content of which is incorporated herein by reference in its entirety. The channel is assumed to be time/frequency invariant (flat) and is further assumed to remain constant over at least two consecutive symbols.

In accordance with the transmission scheme described in Alamouti, the original symbol sequence x(n) is divided into blocks of two consecutive symbols $x_k(n)$ and $x_{k+1}(n)$. In Alamouti every pair of symbols is subsequently mapped according to the following:

$$\begin{bmatrix} x_k \\ x_{k+1} \end{bmatrix} \Rightarrow \begin{bmatrix} x_k & -x_{k+1} \\ x_{k+1}^* & x_k^* \end{bmatrix} = \aleph \quad (1.1)$$

where for simplicity, time-index n is not included in expression (1.1)

Symbols $x_k$ and $x_{k+1}^*$ are transmitted at time k respectively from the first and second transmit antennas. Symbols $-x_{k+1}$ and $x_k^*$ are transmitted at time k+1 respectively from the first and second transmit antennas. The corresponding received signal $r_k$, $r_{k+1}$ at times k and k+1 are defined by the following expressions:

$$r_k = x_k h_1 + x_{k+1}^* h_2 + n_k$$

$$r_{k+1} = -x_{k+1} h_1 + x_k^* h_2 + n_{k+1} \quad (1.2)$$

where $h_1$ and $h_2$ respectively represent the channels associated with the first and second transmission paths, and are further assumed to be constant over two symbol periods. The received signals $r_k$, $r_{k+1}$ may be written as follows:

$$r_k \Box \begin{bmatrix} r_k \\ r_{k+1}^* \end{bmatrix} = \begin{bmatrix} h_1 & -h_2 \\ h_2^* & h_1^* \end{bmatrix} \begin{bmatrix} x_k \\ x_{k+1} \end{bmatrix} + \begin{bmatrix} n_k \\ n_{k+1}^* \end{bmatrix} \quad (1.3)$$

$$= H \cdot \tilde{x}_k + \tilde{n}_k$$

It is understood that the channel matrix H is orthogonal and that an optimum receiver for this transmit diversity scheme multiplies $r_k$ by $H^*$, which is the matched filter receiver, to get two decision statistics for $x_k$ and $x_{k+1}$, i.e., to recover the transmitted symbols. Using this method, a diversity order of two is achieved at a receiver with a single receive antenna.

The method described above may be adapted for use in OFDM systems by replacing the time-domain computations with frequency-domain computations. Assume $X_n$ and $X_{n+1}$ are two OFDM symbols to be transmitted on sub-carriers n and n+1 in an OFDM system. In addition, for each transmit antenna m assume the channel remains constant over two consecutive sub-carriers. That is $$H_{m,n} \approx H_{m,n+1} = H_m \quad (1.4)$$

By replacing the time-domain computations with frequency-domain computations, the received signal vector corresponding to sub-carriers n and n+1 may be written as:

$$R_k \Box \begin{bmatrix} R_k \\ R_{k+1}^* \end{bmatrix} = \begin{bmatrix} H_1 & -H_2 \\ H_2^* & H_1^* \end{bmatrix} \begin{bmatrix} X_k \\ X_{k+1}^* \end{bmatrix} + \begin{bmatrix} V_k \\ V_{k+1}^* \end{bmatrix} \quad (1.5)$$

thus achieving a diversity of 2.

FIG. 1 is a block diagram of a portion of an OFDM transmitter 10 described above. Each OFDM symbol of size N is divided into N/2 groups of symbol pairs $[X_n X_{n+1}]$. Each such pair of symbols is then encoded by the space-frequency encoder 12 to generate two different pairs of symbols $[X_n-X_{n+1}]$ and $[X_{n+1}^* X_n^*]$. Symbol pairs $[X_n-X_{n+1}]$ are grouped into an N—symbol vector that is supplied to an inverse fast Fourier transform (IFFT) 18 block, which in response, generates an associated time-domain vector $x_1$ that is transmitted from antenna 14. Similarly, symbol pairs $[X_{n+1}^*, X_n^*]$ are grouped into another N—symbol vector that is supplied to IFFT 20 block, which in response, generates an associated time-domain vector $x_2$ that is transmitted from antenna 16.

As is seen from FIG. 1 and described above, the space-frequency encoding is performed on the input symbols, i.e., in the frequency domain. Accordingly, space-encoder 12 is required to generate two different streams and hence two separate IFFT blocks 18, 20, each associated with a different transmit antenna, are required for every transmitted OFDM symbol.

BRIEF SUMMARY OF THE DISCLOSURE

In an embodiment, a transmitter comprises at least two antennas and a processor. The processor causes a reversed complex conjugate of a second block to be transmitted from a first antenna during a first time slot and a first block to be transmitted from the first antenna during a second time slot after the first time slot, and causes the reversed complex conjugate of the first block to be transmitted from a second antenna during the first time slot and the second block to be transmitted from the second antenna during the second time slot.

In another embodiment, a method comprises generating a first block comprises a first sequence, generating a second block comprising a second sequence, forming a reversed complex conjugate of the first block, forming a reversed complex conjugate of the second block, providing the reversed complex conjugate of the second block followed by the first block for transmission from a first antenna, and providing the reversed complex conjugate of the first block followed by the second block for transmission from a second antenna.

In a further embodiment, a method of generating blocks for transmission comprises generating a first block, generating a second block, forming a complex conjugate of the second block, and providing the complex conjugate of the second block in an inverse of the first order followed by the first block for transmission from a first antenna.

DETAILED DESCRIPTION OF THE DISCLOSURE

Figure 2:
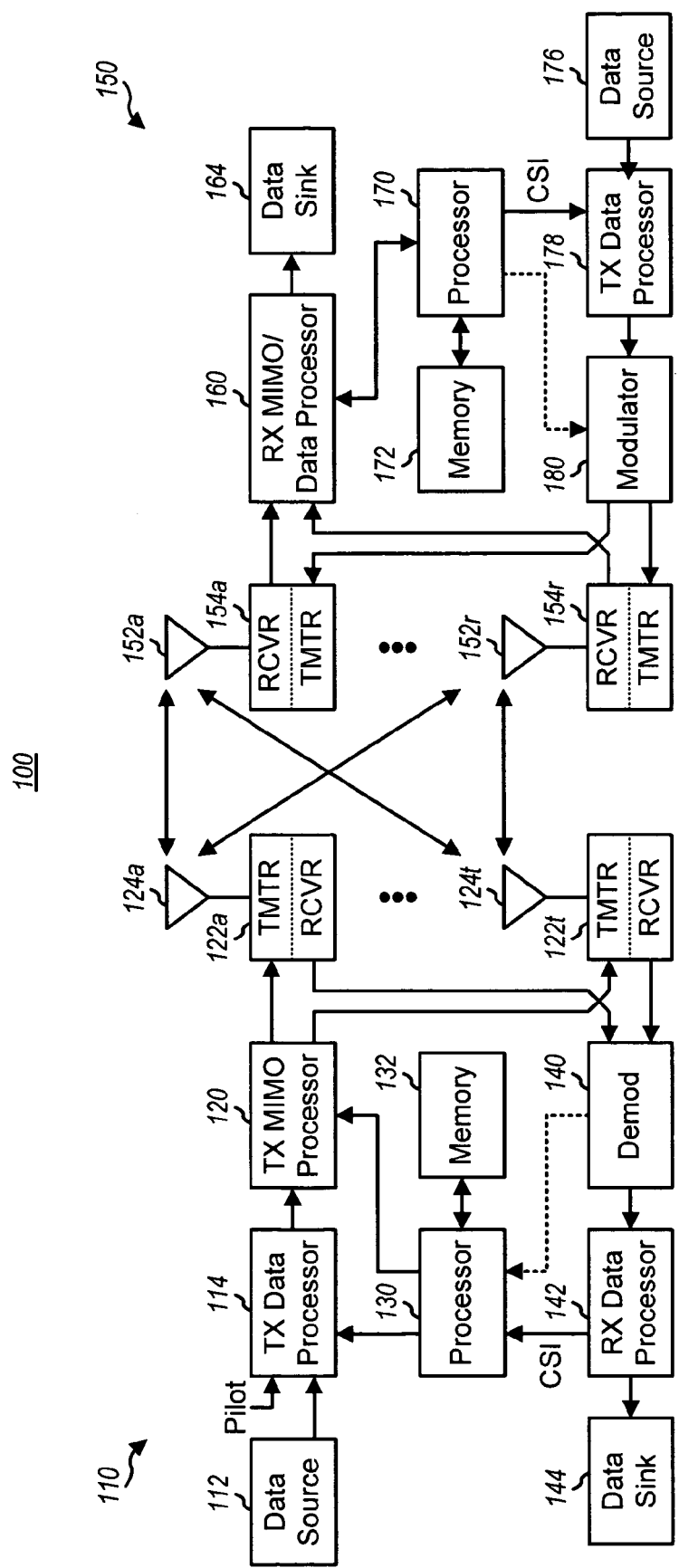
FIG. 2 is a simplified high-level block diagram of a transmitter system and a receiver system in a MIMO system in accordance with one embodiment.

Referring to FIG. 2, a block diagram of an embodiment of a transmitter system 110 and a receiver system 150 in a MIMO system 100 is illustrated. At transmitter system 110, traffic data for a number of data streams is provided from a data source 112 to a transmit (TX) data processor 114. In an embodiment, each data stream is transmitted over a respective transmit antenna. TX data processor 114 formats, codes, and interleaves the traffic data for each data stream based on a particular coding scheme selected for that data stream to provide coded data.

The coded data for each data stream may be multiplexed with pilot data using, for example, time division multiplexing (TDM) or code division multiplexing (CDM). The pilot data is typically a known data pattern that is processed in a known manner (if at all), and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by controls provided by a processor 130.

The modulation symbols for all data streams are then provided to a TX MIMO processor 120, which may further process the modulation symbols (e.g., for OFDM). TX MIMO processor 120 then provides $N_T$ modulation symbol streams to $N_T$ transmitters (TMTR) 122a through 122t. In an embodiment, TX MIMO processor 120 may provide the modulation symbols so that transmission symbols are arragned to be transmitted in pairs, where each pair is transmitted from at least two antennas and with each symbol being a sequentially reversed complex conjugate version of a symbol that is transmitted from another antenna as part of a same pair.

Each transmitter 122 receives and processes symbol pairs in the form of symbol streams and provides one or more analog signals, and further conditions (e.g., amplifies, filters, and upconverts) the analog signals to provide a modulated signal suitable for transmission over the MIMO channel. $N_T$ modulated signals from transmitters 122a through 122t are then transmitted from $N_T$ antennas 124a through 124t, respectively.

At receiver system 150, the transmitted modulated signals are received by $N_R$ antennas 152a through 152r, and the received signal from each antenna 152 is provided to a respective receiver (RCVR) 154. Each receiver 154 conditions (e.g., filters, amplifies, and downconverts) a respective received signal, digitizes the conditioned signal to provide samples, and further processes the samples to provide a corresponding "received" symbol stream.

An RX MIMO/data processor 160 then receives and processes the $N_R$ received symbol streams from $N_R$ receivers 154 based on a particular receiver processing technique to provide $N_T$ "detected" symbol streams. The processing by RX MIMO/data processor 160 is described in further detail below. Each detected symbol stream includes symbols that are estimates of the modulation symbols transmitted for the corresponding data stream. RX MIMO/data processor 160 then demodulates, deinterleaves, and decodes each detected symbol stream to recover the traffic data for the data stream. The processing by RX MIMO/data processor 160 is complementary to that performed by TX MIMO processor 120 and TX data processor 114 at transmitter system 110.

RX MIMO processor 160 may derive an estimate of the channel response between the $N_T$ transmit and $N_R$ receive antennas, e.g., based on the pilot multiplexed with the traffic data. The channel response estimate may be used to perform space or space/time processing at the receiver. RX MIMO processor 160 may further estimate the signal-to-noise-and-interference ratios (SNRs) of the detected symbol streams, and possibly other channel characteristics, and provides these quantities to a processor 170. RX MIMO/data processor 160 or processor 170 may further derive an estimate of the "operating" SNR for the system, which is indicative of the conditions of the communication link. Processor 170 then provides channel state information (CSI), which may comprise various types of information regarding the communication link and/ or the received data stream. For example, the CSI may comprise only the operating SNR. The CSI is then processed by a TX data processor 178, modulated by a modulator 180, conditioned by transmitters 154a through 154r, and transmitted back to transmitter system 110.

At transmitter system 110, the modulated signals from receiver system 150 are received by antennas 124, conditioned by receivers 122, demodulated by a demodulator 140, and processed by a RX data processor 142 to recover the CSI reported by the receiver system. The reported CSI is then provided to processor 130 and used to (1) determine the data rates and coding and modulation schemes to be used for the data streams and (2) generate various controls for TX data processor 114 and TX MIMO processor 120.

Processors 130 and 170 direct the operation at the transmitter and receiver systems that they are coupled with including the appropriate transmit and receive data processors. Memories 132 and 172 provide storage for program codes and data used by processors 130 and 170, respectively.

Figure 3:
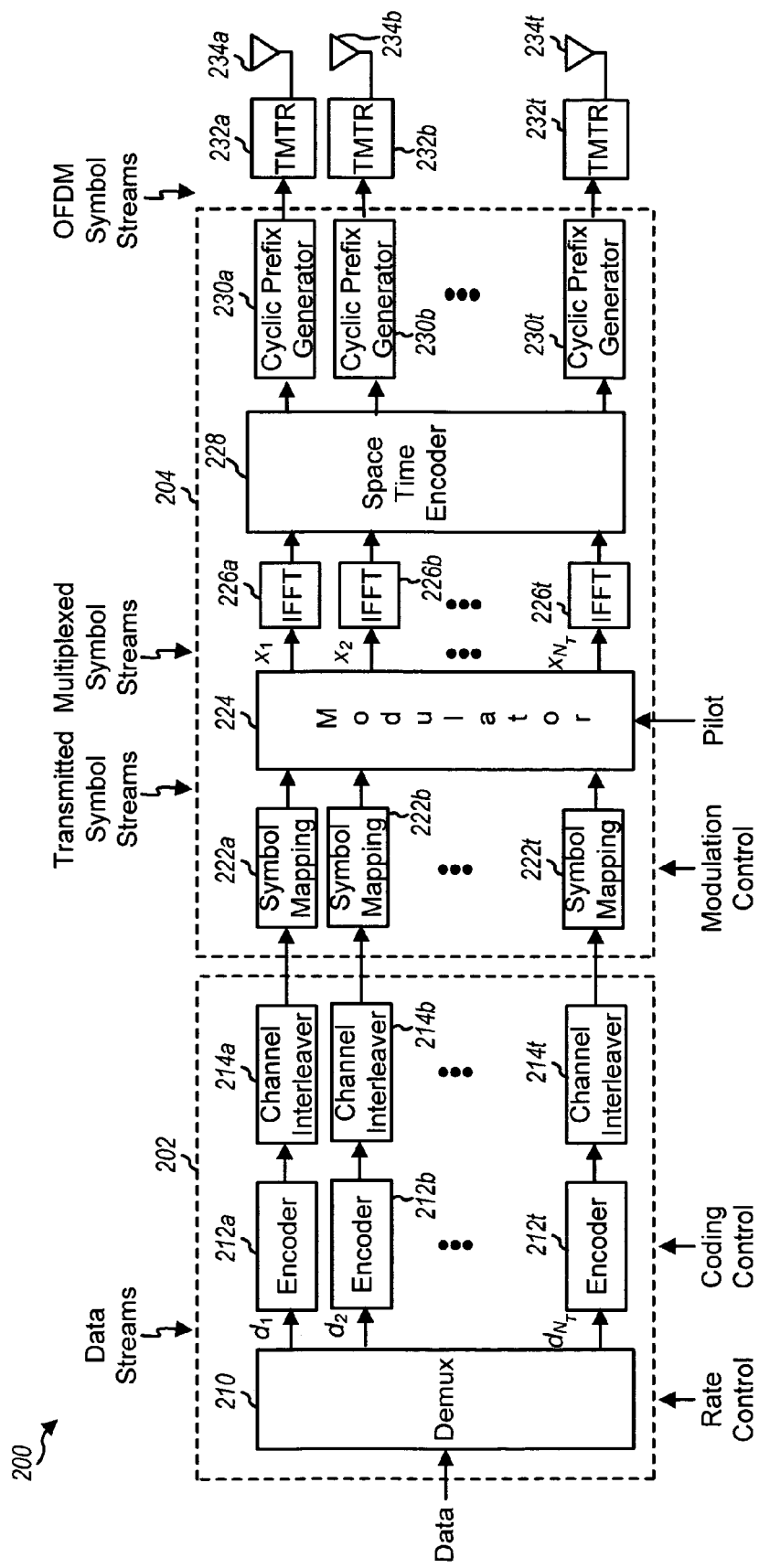
FIG. 3 is a simplified high-level block diagram of a transmitter in accordance with one embodiment.

Referring to FIG. 3, a functional block diagram of a transmitter system including multiple transmit antennae according to one embodiment is illustrated. In one embodiment, a separate data rate and coding and modulation scheme may be used for each of the $N_T$ data streams to be transmitted on the $N_T$ transmit antennae (i.e., separate coding and modulation on a per-antenna basis). The specific data rate and coding and modulation schemes to be used for each transmit antenna may be determined based on controls provided by processor 130 (FIG. 2), and the data rates may be determined as described above.

Transmitter unit 100 includes, in one embodiment, a transmit data processor 202 that receives, codes, and modulates each data stream in accordance with a separate coding and modulation scheme to provide modulation symbols and transmit MIMO Transmit data processor 202 and transmit processor 204 are one embodiment of transmit data processor 114 and transmit processor 120, respectively, of FIG. 2.

In one embodiment, as shown in FIG. 3, transmit data processor 202 includes demultiplexer 210, $N_T$ encoders 212a through 212t, and $N_T$ channel interleavers 214a through 214t (i.e., one set of demultiplexers, encoders, and channel interleavers for each transmit antenna). Demultiplexer 210 demultiplexes data (i.e., the information bits) into $N_T$ data streams for the $N_T$ transmit antennae to be used for data transmission. The $N_T$ data streams may be associated with different data rates, as determined by rate control functionality, which in one embodiment may be provided by processor 130 or 170 (FIG. 2). Each data stream is provided to a respective encoder 212a through 212t.

Each encoder 212a through 212t receives and codes a respective data stream based on the specific coding scheme selected for that data stream to provide coded bits. In one embodiment, the coding may be used to increase the reliability of data transmission. The coding scheme may include in one embodiment any combination of cyclic redundancy check (CRC) coding, convolutional coding, Turbo coding, block coding, or the like. The coded bits from each encoder 212a through 212t are then provided to a respective channel interleaver 214a through 214t, which interleaves the coded bits based on a particular interleaving scheme. The interleaving provides time diversity for the coded bits, permits the data to be transmitted based on an average SNR for the transmission channels used for the data stream, combats fading, and further removes correlation between coded bits used to form each modulation symbol.

The coded and interleaved bits from each channel interleaver 214a through 214t are provided to a respective symbol mapping block 222a through 222t, of transmit processor 204, which maps these bits to form modulation symbols.

Figure 1:
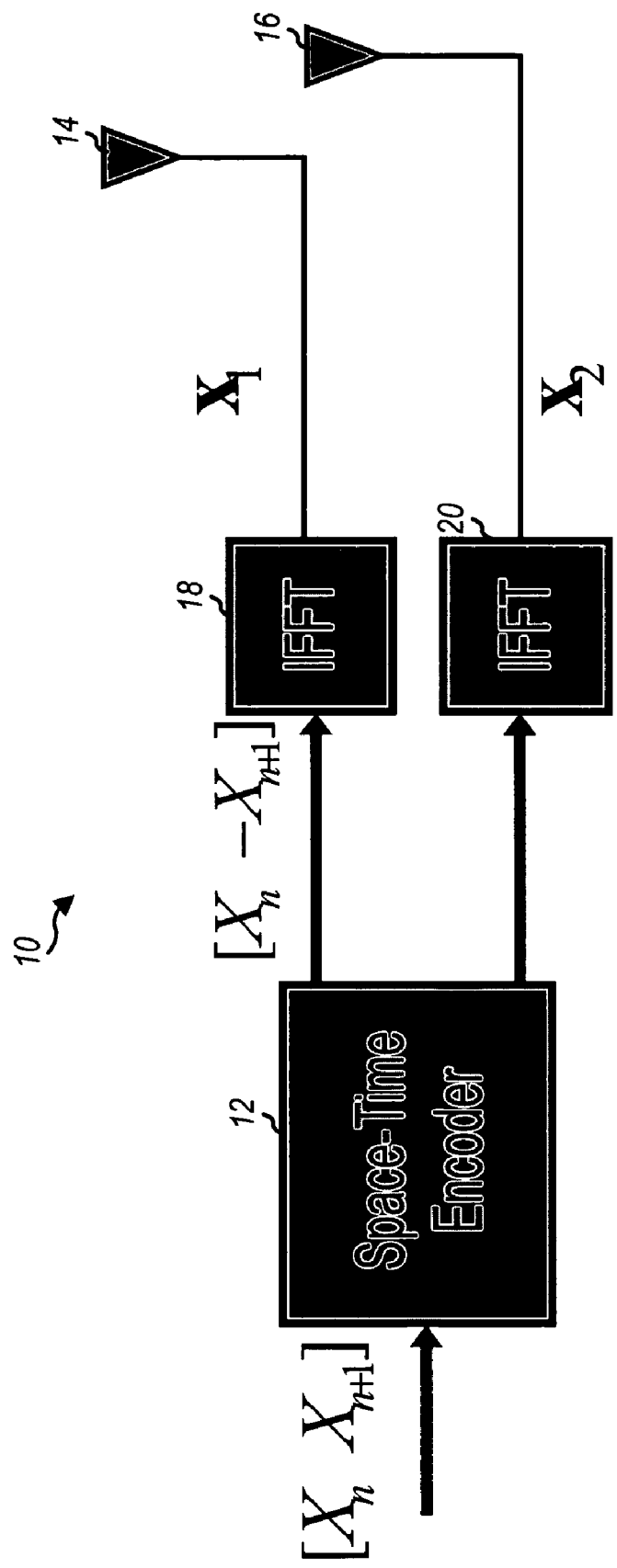
FIG. 1 is a simplified high-level block diagram of some blocks of an OFDM transmitter, as known in the prior art.

The particular modulation scheme to be implemented by each symbol mapping block 222a through 222t is determined by the modulation control provided by processor 130 (FIG. 1). Each symbol mapping block 222a through 222t groups sets of $q_j$ coded and interleaved bits to form non-binary symbols, and further maps each non-binary symbol to a specific point in a signal constellation corresponding to the selected modulation scheme (e.g., QPSK, M-PSK, M-QAM, or some other modulation scheme). Each mapped signal point corresponds to an $M_j$-ary modulation symbol, where $M_j$ corresponds to the specific modulation scheme selected for the j-th transmit antenna and $M_j = 2^{q_j}$. Symbol mapping blocks 422a through 222t then provide $N_T$ streams of modulation symbols.

In the specific embodiment illustrated in FIG. 3, transmit processor 304 also includes a modulator 224 and inverse Fast Fourier transform (IFFT) block 226a through 226t, along with symbol mapping blocks 222a through 222t. Modulator 224 modulates the samples to form the modulation symbols for the $N_T$ streams on the proper subbands and transmit antennas. In addition modulator 224 provides each of the $N_T$ symbol streams at a proscribed power level. In one embodiment, modulator 224 may modulate symbols according to a FH sequence controlled by a processor, e.g. processor 130 or 170. In such an embodiment, the frequencies with which the $N_T$ symbol streams are modulated may vary for each group or block of symbols, frame, or portion of a frame of a transmission cycle.

Each IFFT block 226a through 226t receives a respective modulation symbol stream from modulator 224. Each IFFT block 226a through 226t groups sets of NF modulation symbols to form corresponding modulation symbol vectors, and converts each modulation symbol vector into its time-domain representation (which is referred to as an OFDM symbol) using the inverse fast Fourier transform. IFFT blocks 226a through 226t may be designed to perform the inverse transform on any number of frequency subchannels (e.g., 8, 16, 32, . . . , $N_F$,). Each time-domain representation of the modulation symbol vector generated by IFFT blocks 226a through 226t is provided to encoder 228.

In the embodiment of FIG. 2, modulated data includes symbols which may provided in a symbol stream, e.g. symbols $X_i, X_{i+1}, \ldots X_n$. IFFT blocks 226a through 226t receive the symbol stream, symbols $X_i, X_{i+1}, \ldots X_n$ and provide time domain sequences of each symbol that correspond to the samples of each symbol, e.g. sequence $x_i$ for symbol $X_i$, sequence $x_{i+1}$ for symbol $X_{i+1}$, and sequence $x_n$ for symbol $X_n$. Encoder 228, using the received sequences $x_i, x_{i+1}, \ldots x_n$ generates sequences $\tilde{x}_i, -\tilde{x}_{i+1}, \ldots -\tilde{x}_N$ Where sequence $\tilde{x}_i$ is a reversed complex conjugate sequence of sequence $x_i$, sequence $\tilde{x}_{i+1}$ is a reversed complex conjugate sequence associated with sequence $x_{i+1}$, etc. Encoder 228 provides symbol pairs to transmitters 230a through 232t, so that any symbol pair that is transmitted from two or more antennas is transmitted in the form of $-\tilde{x}_{i+1}, x_i$ from a first antenna, e.g. antenna 232a, in first and second time slots and is transmitted in the form of $\tilde{x}_i, x_{i+1}$ from a second antenna, e.g. antenna 232b, in the first and second time slots. In other words, during time slot i, sequence $-\tilde{x}_{i+1}$ is transmitted from transmit antenna 232a and sequence $\tilde{x}_i$ is transmitted from transmit antenna 232b. At time slot i+1, sequence $\tilde{x}_i$ is transmitted from transmit antenna 232a and sequence $x_{i+1}$ is transmitted from transmit antenna 232a.

For a symbol stream or group of symbols $X_i(n) = X_i(n)$, $n=0, 1, \ldots, N-1$, is the n-th information symbol in the i-th OFDM symbol. The sequence for the i-th OFDM symbol may be defined, in vector format, as $$X_i = [X_i(0) X_i(1) \ldots X_i(N-1)]^T \quad (2.1)$$

Let $x_i(k)$, $k=0, 1, \ldots, N-1$ represent the corresponding IFFT output (i.e. the time domain samples of the symbol $X_i$), and let the symbol energy $E_s = E\{X_i(n)X_i^*(n)\}$ be 1, i.e. the maximum energy allotted for transmission of the symbol.

Further, let sequences $x_i$ and $x_{i+1}$ represent corresponding IFFT of consecutive OFDM symbols $X_i$ and $X_{i+1}$. Using $\tilde{x}_i$ and $x_{i+1}$, sequences $\tilde{x}_i$ and $-\tilde{x}_{i+1}$ are defined as below:

$$\tilde{x}_i(k) = \overline{x}_i(N-K) \quad 0 \leq k \leq N-1$$

$$\tilde{x}_{i+1}(k) = \overline{x}_{i+1}(N-K) \quad 0 \leq k \leq N-1 \quad (2.2)$$

where $\overline{(\cdot)}$ denotes a complex conjugate operation for scalars and element by element complex conjugate for vectors and matrices. Accordingly, $\tilde{x}_i$ and $-\tilde{x}_{i+1}$ are ordinally reversed and element by element complex conjugated sequences of $x_i$ and $x_{i+1}$, respectively.

The output of encoder 228 is coupled to cyclic prefix generators 230a through 230t. The cyclic prefix generators 230a through 230t pre-pending a prefix of a fixed number of samples, which are generally a number of samples from the end of the OFDM symbol, to the $N_S$ samples that constitute an OFDM symbol to form a corresponding transmission symbol. The prefix is designed to improve performance against deleterious path effects such as channel dispersion caused by frequency selective fading.

The symbols output by cyclic prefix generators 230a through 230t are provided to an associated transmitter 232a through 232t which causes the symbols to be transmitted by antennas 234a through 234t.

It should be noted that while the above discussion refers to $X_i$ and $X_{i+1}$ as symbols and $x_i$ and $x_{i+1}$ as time domain sequences of symbols $X_i$ and $X_{i+1}$, that the same approach may be applied to blocks of symbols or sequences. For example, $X_i$ and $X_{i+1}$ may each represent N symbols, where N may greater than or less than 1. In such a case, $x_i$ and $x_{i+1}$ would represent time-domain sequences of N symbols and $\tilde{x}_i$ and $\tilde{x}_{i+1}$ are reversed complex conjugates of N symbols.

While the above discussion relates to an embodiment utilizing two symbols transmitted over two time-slots, a greater number of symbols over a larger number of time slots may also be utilized in accordance with the embodiments described herein. In such embodiments, the matrix, which is defined by the number of transmission symbols and the number of antennas, is a unitary matrix. This allows for different rates to be utilized for transmission, i.e. n transmit symbols per m transmit antennas where n>m. For example, a three antenna system consisting of antennas $a_1$, $a_2$, and $a_3$ may transmit symbols $x_1$, $x_2$, $x_3$, and $x_4$ may utilize the following transmission scheme which is defined by an x by a matrix $M_t$ $$\begin{pmatrix} x_1 & x_2 & x_3 \\ -x_2 & x_1 & -x_4 \\ -x_3 & x_4 & x_1 \\ -x_4 & -x_3 & x_2 \\ \tilde{x}_1 & \tilde{x}_2 & \tilde{x}_3 \\ -\tilde{x}_2 & \tilde{x}_1 & -\tilde{x}_4 \\ -\tilde{x}_3 & \tilde{x}_4 & \tilde{x}_1 \\ -\tilde{x}_4 & -\tilde{x}_3 & \tilde{x}_2 \end{pmatrix} M_t$$

where $\tilde{x}_1$, $\tilde{x}_2$, $\tilde{x}_3$, and $\tilde{x}_4$ are time reversed complex conjugates of symbols $x_1$, $x_2$, $x_3$, and $x_4$, respectively, $-x_2$, $-x_3$, and $-X_4$ are inverted symbols $x_2$, $x_3$, and $x_4$, respectively, and $-\tilde{x}_2$, $-\tilde{x}_3$, and $-\tilde{x}_4$ are inverted complex conjugates of symbols $x_2$, $x_3$, and $x_4$, respectively.

The order of the symbols may be provided by encoder 228 in the order specified in $M_t$ or any other scheme based upon a unitary matrix.

In some embodiments, encoder 228 may comprise a memory, e.g. one or more buffers, that stores the time domain symbols, their complex conjugates, their inverses, and inverted complex conjugates, and then may output them based upon a scheme based upon a unitary matrix to a plurality of transmit antennas.

Figure 4:
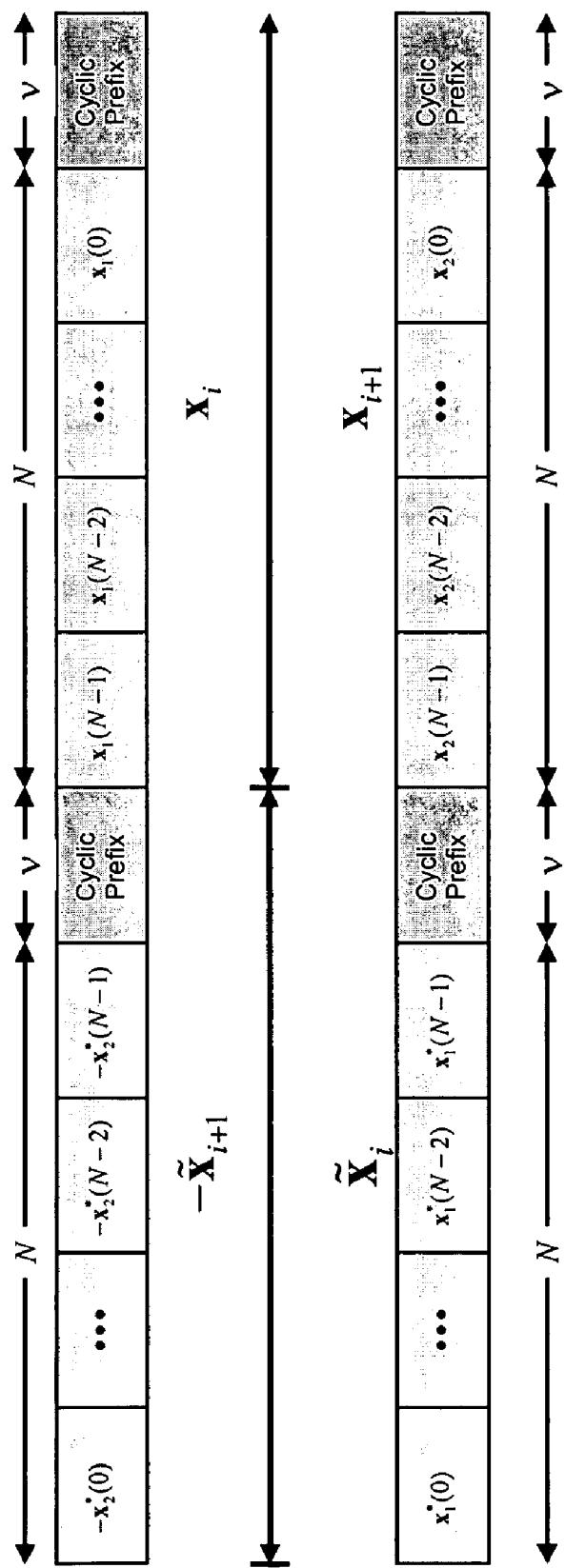
FIG. 4 shows symbols with respective cyclic prefixes for transmission in accordance with one embodiment.

Referring to FIG. 4, symbols with respective cyclic prefixes for transmission in accordance with one embodiment are illustrated. At time slot i, time-domain sequence $x_i$ is appended with its cyclic prefix and transmitted from a first transmit antenna, and time-domain sequence $-\tilde{x}_{i+1}$ is appended with its cyclic prefix and transmitted from a second transmit antenna. At time slot i+1, time-domain sequence $x_{i+1}$ is appended with its cyclic prefix and transmitted from the fist transmit antenna, and time-domain sequence $\tilde{x}x_i$ is appended with its cyclic prefix and transmitted from the second antenna.

Figure 5:
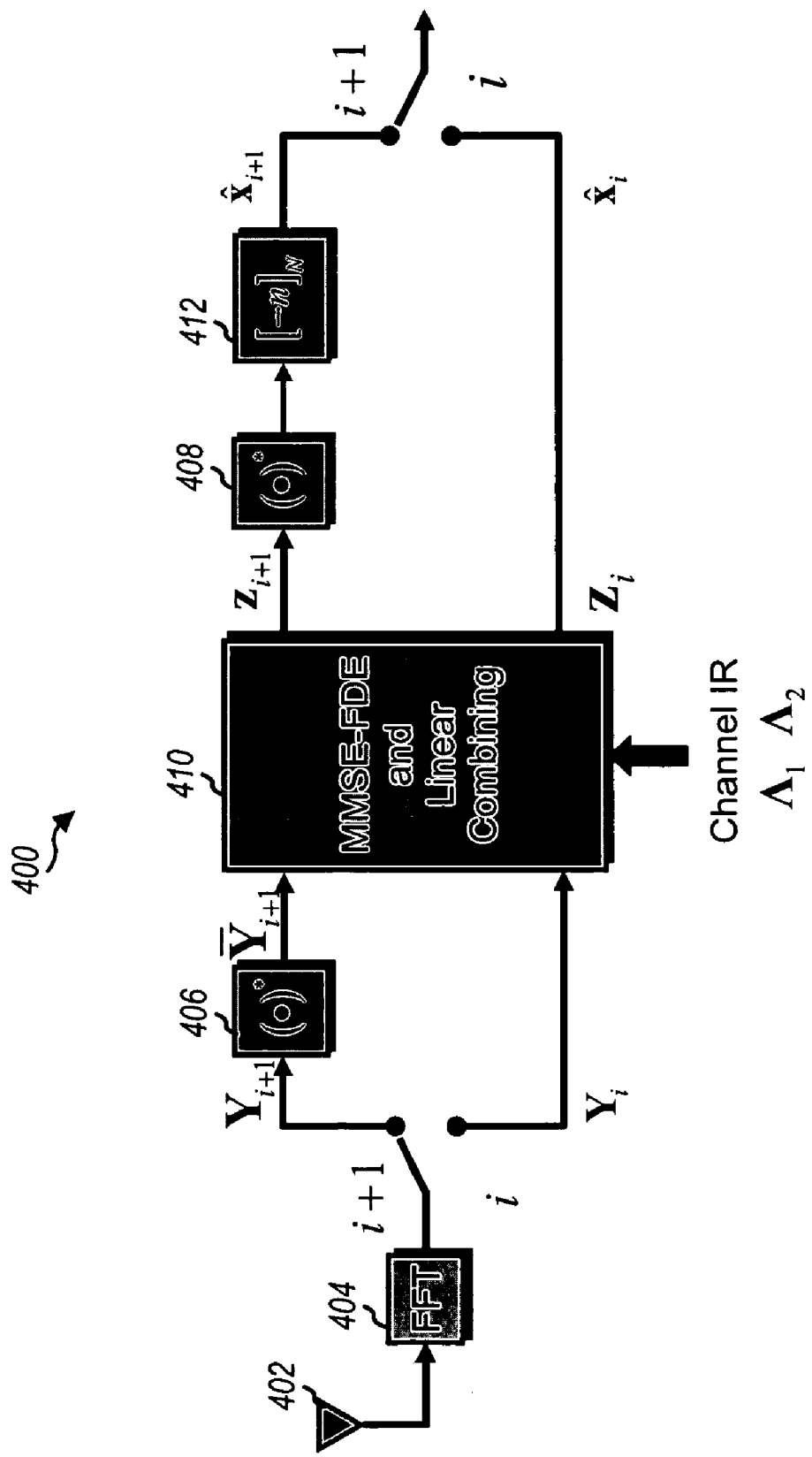
FIG. 5 is a simplified high-level block diagram of some blocks of an OFDM receiver, in accordance with one embodiment.

Referring to FIG. 5, a simplified high-level block diagram of some blocks of an OFDM receiver, in accordance with one embodiment is illustrated. Receiver 400 is adapted to receive sequences $y_i$ and $y_{i+1}$ via receive antenna 402 and to demodulate and decode the sequences. As seen from FIG. 5, receiver 400 is shown as including, in part, a discrete Fourier transform block 404, processing blocks 406 and 408, each of which provides a complex conjugate function of the function the block receives, decoder/equalizer block 410, and block 412 which performs time reverse operation.

In transmission of the symbols or blocks, $h_m(k)$ represents the symbol spaced channel impulse response for two transmit antennas m, m=1,2, where the first transmit antenna is represented by m=1 and the second transmit antenna is represented by m=2. In this case, $h_m(k)$ may be defined as:

$$h_m(k) = \sum_{l=0}^{L} h_{m,l} \delta(k-l) \quad (2.3)$$

At the receiver of the blocks or symbols, sequences $y_i$ and $y_{i+1}$ represent the received time-domain sequences corresponding to time slots i and i+1, respectively, that are transmitted sequences $x_i$ and $x_{i+1}$ with their respective cyclic prefixes removed.

Sequences $y_i$ and $y_{i+1}$ received by receive antenna 402 are shown below:

$$y_i = [y_i(0) y_i(1) \ldots y_i(N-1)]^T$$

$$y_{i+1} = [y_{i+1}(0) y_{i+1}(1) \ldots y_{i+1}(N-1)]^T \quad (2.4)$$

and may be expressed as shown below:

$$y_i = H_1 \cdot x_i - H_2 \cdot \tilde{x}_{i+1} + v_i$$

$$y_{i+1} = H_1 \cdot x_{i+1} + H_2 \cdot \tilde{x}_i + v_{i+1} \quad (2.5)$$

where both sequences $v_i$ and $v_{i+1}$ are white independent identically distributed (i.i.d.) Gaussian random noise vectors with covariance $\sigma^2 \times I$. Accordingly, the signal to noise ratio SNR is:

$$SNR = \rho = \frac{1}{\sigma^2} \quad (2.6)$$

where $H_m$, m=1,2 is the channel matrix corresponding to transmit antenna m and is given by:

$$H_m = \begin{bmatrix} h_{m,0} & h_{m,1} & \ldots & h_{m,L} & 0 & \ldots & 0 \\ 0 & h_{m,0} & \ddots & h_{m,L-1} & h_{m,L} & \ldots & 0 \\ 0 & \ddots & \ddots & \ddots & \ddots & \ddots & 0 \\ 0 & \ldots & 0 & h_{m,0} & h_{m,1} & \ldots & h_{m,L} \\ h_L & 0 & \ldots & \ldots & h_o & \ldots & h_{L-1} \\ \vdots & \ddots & \ddots & \ddots & \ddots & \ddots & \vdots \\ h_{m,1} & \ldots & h_{m,L} & 0 & \ldots & 0 & h_{m,0} \end{bmatrix} \quad (2.7)$$

The matrix $H_m$ is circulant and has the following eigenvalue decomposition:

$$H_m = Q'\Lambda_m Q \quad (2.8)$$

where Q is the N×N discrete Fourier transform matrix (DFT) as shown below:

$$Q(k, n) = \frac{1}{\sqrt{N}} \cdot e^{-j2\pi kn/N} \quad (2.9)$$

and $\Lambda_m$ is the diagonal eigenvalue matrix whose diagonal is the N point DFT of $h_{m,0}, h_{m,1}, \ldots, h_{m,L}$.

Using the DFT property that $$DFT(\tilde{x}_i) = DFT(\overline{x}_i[-n]_N) = \overline{X}_i$$

where by definition:

$$X_i = DFT(x_i) = Q \cdot x_i$$

$$V_i = DFT(v_i) = Q \cdot v_i$$

the following expression (2.7) is attained. FFT block 402 receives symbol (signal vector) $y_i$ and, in response, generates signal vector $Y_i$. FFT block 402 also receives signal vector $y_{i+1}$ and, in response, generates signal vector $Y_{i+1}$. Signal vectors $Y_i$ and $Y_{i+1}$ are expressed as shown below:

$$Y_i \square Q \cdot y_i = Q \cdot Q^* \Lambda_1 Q \cdot x_i - Q \cdot Q^* \Lambda_2 Q \cdot \tilde{x}_{i+1} + Q \cdot v_i \quad (2.10)$$

$$= \Lambda_1 X_i - \Lambda_2 \overline{X}_{i+1} + V_i$$

$$Y_{i+1} \square Q \cdot y_{i+1} = Q \cdot Q^* \Lambda_1 Q \cdot x_{i+1} + Q \cdot Q^* \Lambda_2 Q \cdot \tilde{x}_i + Q \cdot v_{i+1}$$

$$= \Lambda_1 X_{i+1} - \Lambda_2 \overline{X}_i + V_{i+1}$$

Signal vector $Y_i$ is delivered to decoder/equalizer block 410. Signal $Y_{i+1}$ is delivered to processing block 104, which in response, generates and delivers to decoder/equalizer block 410, complex conjugate vector signal $\overline{Y}_{i+1}$.

Expression (2.10) may be written as:

$$Y_i = \begin{bmatrix} Y_i \\ \overline{Y}_{i+1} \end{bmatrix} \quad (2.11)$$

$$= \begin{bmatrix} \Lambda_1 & -\Lambda_2 \\ \Lambda_2^* & \Lambda_1^* \end{bmatrix} \begin{bmatrix} X_i \\ \overline{X}_{i+1} \end{bmatrix} + \begin{bmatrix} V_i \\ \overline{V}_{i+1} \end{bmatrix}$$

$$= H \cdot X_i + V_i$$

where $Y_i$ is a 2N×1 vector. Since the DFT matrix Q is an orthogonal matrix, the noise vector $V_i$ is also white. Hence decoder/equalizer block 410, which is adapted to perform a minimum mean-squared error (MMSE) as well as decoding/equalizing filter operation, is characterized by the following matrix filter W:

$$W = \left[ H \cdot H^* + \frac{1}{\rho} \cdot I \right]^{-1} H \quad (2.12)$$

Assume that the channel impulse response associated with the first and second transmission channels is respectively represented by $\Lambda_1$ and $\Lambda_2$. Matrix D is defined as follows:

$$D = \Lambda_1 \Lambda_1^* + \Lambda_2 \Lambda_2^*$$

Matrix D is an N×N diagonal matrix whose (n,n) element $d_{nn}$ is shown below:

$$|\Lambda_1(i,i)|^2 + |\Lambda_2(i,i)|^2$$

Matrix $\tilde{D}$ is defined as:

$$\tilde{D} = D + \frac{1}{\rho} I$$

where $\rho$ is the SNR. Accordingly:

$$\tilde{D}^{-1} \Lambda_m = \Lambda_m \tilde{D}^{-1} \text{ and } \tilde{D}^{-1} \Lambda_m^* = \Lambda_m^* \tilde{D}^{-1}.$$

Therefore, matrix W may be defined as shown below:

$$W = \begin{bmatrix} \Lambda_1 & -\Lambda_2 \\ \Lambda_2^* & \Lambda_1^* \end{bmatrix} \begin{bmatrix} \tilde{D}^{-1} & 0 \\ 0 & \tilde{D}^{-1} \end{bmatrix} \quad (2.13)$$

$$= W_d \cdot W_e$$

As seen from expression (2.13), the matrix filter W includes two parts. The first part, $W_d$, represents the decoding operation of the space-time block code. The second part, $W_e$, represents the MMSE frequency domain equalizer part. Applying matrix filter W to the received signal vector $Y_i$ provides the following:

$$\begin{bmatrix} Z_i \\ \overline{Z}_{i+1} \end{bmatrix} \square W \tilde{y}^* \cdot Y_i = \tilde{D}^{-1} \cdot \begin{bmatrix} \Lambda_1^* Y_i + \Lambda_2 \overline{Y}_{i+1} \\ -\Lambda_2^* Y_i + \Lambda_1 \overline{Y}_{i+1} \end{bmatrix} \quad (2.14)$$

$$= \tilde{D}^{-1} D \cdot \begin{bmatrix} X_i \\ \overline{X}_{i+1} \end{bmatrix} + \begin{bmatrix} \tilde{V}_i \\ \tilde{V}_{i+1} \end{bmatrix}$$

Vectors $Z_i$ and $Z_{i+1}$ are generated by decoder/equalizer block 410. Expression (2.14) may be rewritten as shown below:

$$\begin{bmatrix} Z_i \\ \overline{Z}_{i+1} \end{bmatrix} = \tilde{D}^{-1} D \cdot \begin{bmatrix} X_i \\ X_{i+1} \end{bmatrix} + \begin{bmatrix} \tilde{V}_i \\ \overline{\tilde{V}}_{i+1} \end{bmatrix} \quad (2.15)$$

It is thus seen that matrix $\tilde{D}^{-1} D$ is a diagonal matrix whose (n,n) element $g_{nn}$ is shown below:

$$g_{nn} = \frac{|\Lambda_1(n,n)|^2 + |\Lambda_2(n,n)|^2}{|\Lambda_1(n,n)|^2 + |\Lambda_2(n,n)|^2 + 1/\rho} \quad (2.16)$$

It is also seen that the following expression applies:

$$E\{\tilde{V}_i \tilde{V}_i^*\} = E\{\overline{V}_{i+1} \overline{V}_{i+1}^*\} = R_v$$

where $R_v$ is an (n,n) diagonal matrix (n,n), whose element $\xi_{nn}$ is provided by the following expression:

$$\zeta_{nn} = \frac{1}{\rho} \cdot \frac{|\Lambda_1(n,n)|^2 + |\Lambda_2(n,n)|^2}{(|\Lambda_1(n,n)|^2 + |\Lambda_2(n,n)|^2 + 1/\rho)^2} \quad (2.17)$$

where both $\hat{V}_i$ and $\overline{V}_{i+1}$ are independent identically distributed (i.i.d.) Gaussian random vectors.

Using expressions (2.15), (2.16), and (2.17), the decision statistic $\hat{X}_i(n)$ for symbol $X_i(n)$, which is the n-th information symbol transmitted in the i-th OFDM block, may be expressed as shown below:

$$s_i(n) = g_{nn} \cdot X_i(n) + v_i(n) \quad (2.18)$$

and the corresponding signal-to-noise ratio (SNR) $SNR_i(n)$ may be expressed as shown below:

$$SNR_i(n) = \frac{g_{nn}^2}{\zeta_{nn}} \quad (2.19)$$
$$= \rho \cdot (|\Lambda_1(n,n)|^2 + |\Lambda_2(n,n)|^2)$$
$$= SNR \cdot (|\Lambda_1(n,n)|^2 + |\Lambda_2(n,n)|^2)$$

Similarly, the decision statistic $\hat{X}_{i+1}(n)$ for symbol $X_{i+1}(n)$, which is the n-th information symbol transmitted in the i+1 OFDM block, may be expressed as shown below:

$$s_{i+1}(n) = g_{nn} \cdot X_{i+1}(n) + v_{i+1}(n) \quad (2.20)$$

and the corresponding signal to noise ration $SNR_{i+1}(n)$ may be expressed as shown below:

$$SNR_{i+1}(n) = \frac{g_{nn}^2}{\zeta_{nn}} \quad (2.21)$$
$$= \rho \cdot (|\Lambda_1(n,n)|^2 + |\Lambda_2(n,n)|^2)$$
$$= SNR \cdot (|\Lambda_1(n,n)|^2 + |\Lambda_2(n,n)|^2)$$

Thus a diversity gain of order 2 is achieved.

In those cases, where more than two transmit antennas are utilized and more than two transmit symbols are grouped together, receiver includes additional outputs from decoder/equalizer block 410 which each provide the appropriate inversion and complex conjugation functions based upon the number of transmit antennas at the transmitter.

The functionality described with respect to FIG. 5 may be implemented in receive processor 142 and processor 130 and receive processor 160 and processor 170. In such a case, the functionality described with respect to elements 404, 406, 408, 410, and 412 may provided in the processors.

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, processors, modules, and circuits described in connection with the embodiments disclosed herein may be implemented or performed with a general purpose processor, a digital signal processor (DSP), circuits, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, processor, microprocessor, or state machine. A processor may also be implemented as a combination of devices, e.g., a combination of a DSP and a microprocessor, a plurality of microprocessors, one or more microprocessors in conjunction with a DSP core, multiple logic elements, multiple circuits, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A receiver comprising:
   a receive antenna that receives sequences, wherein a first received sequence and a second received sequence are represented by vectors $Y_i$ and $Y_{i+1}$ where $$\begin{bmatrix} Y_i \\ \overline{Y}_{i+1} \end{bmatrix} = \begin{bmatrix} \Lambda_1 & -\Lambda_2 \\ \Lambda_2^* & \Lambda_1^* \end{bmatrix} \begin{bmatrix} \hat{X}_i \\ \hat{\overline{X}}_{i+1} \end{bmatrix} + \begin{bmatrix} V_i \\ \overline{V}_{i+1} \end{bmatrix}$$

Wherein $\Lambda_1$ is an impulse response associated with a first transmit channel, wherein $\Lambda_2^*$ is an impulse response associated with a second transmit channel, wherein $\Lambda_1^*$ and $\Lambda_2^*$ respectively represent complex conjugates of $\Lambda_1$ and $\Lambda_2$, and wherein $$\begin{bmatrix} V_i \\ \overline{V}_{i+1} \end{bmatrix}$$

represents noise associated with the first and the second transmit channels, wherein $\hat{X}_i$ corresponds to an estimate of $X_1$, and wherein $\hat{X}_{i+1}$ corresponds to an estimate of $X_{i+1}$; and a processor that generates complex conjugates of sequences received during a first time slot, to process sequences received during a second time slot following the first time slot without generating complex conjugates, and to combine the complex conjugates of sequences received during the first time slot and the sequences received during the second time slot to generate decoded symbols, wherein the processor generates decoded equalized vectors $Z_i$, and $Z_{i+1}$ from $Y_i$ and $\overline{Y}_{i+1}$ defined by:

$$\begin{bmatrix} Z_i \\ Z_{i+1} \end{bmatrix} = \tilde{D}^{-1} \cdot \begin{bmatrix} \Lambda_1^* Y_i + \Lambda_2 \overline{Y}_{i+1} \\ -\Lambda_2^* Y_i + \Lambda_1 \overline{Y}_{i+1} \end{bmatrix}$$

where $$\tilde{D} = D + \frac{1}{\rho} I,$$

wherein I is an identity matrix, wherein $D = \Lambda_1 \Lambda_1^* + \Lambda_2 \Lambda_2^*$ and wherein $\rho$ represents a signal-to-noise ratio.

2. The receiver of claim 1, wherein the first time slot and the second time slot are consecutive time slots.

3. The receiver of claim 1, the sequences comprise symbols and wherein the processor is further configured to reverse an order of at least some of the complex conjugates of the sequences.

4. The receiver of claim 1, wherein a cyclic prefix is removed from the beginning of each sequence.

5. The receiver of claim 4, wherein the cyclic-prefix represents a fixed sample form the end of a symbol included in the sequence.

* * * * *